May 3, 1960 J. WILFORD CROLY ET AL 2,935,688

CLAMPING CIRCUIT

Filed July 16, 1958

INVENTORS
J. WILFORD CROLY
RICHARD A. HERNDON
BY G. D. O'Brien
P. Foster Warner
ATTORNEYS 2,935,688
Patented May 3, 1960

2,935,688

CLAMPING CIRCUIT

J. Wilford Croly, Burlington, N.J., and Richard A. Herndon, Dallas, Tex., assignors, by mesne assignments, to the United States of America as represented by the Secretary of the Navy Application July 16, 1958, Serial No. 749,036

5 Claims. (Cl. 328—173)

Figures 1, 2:
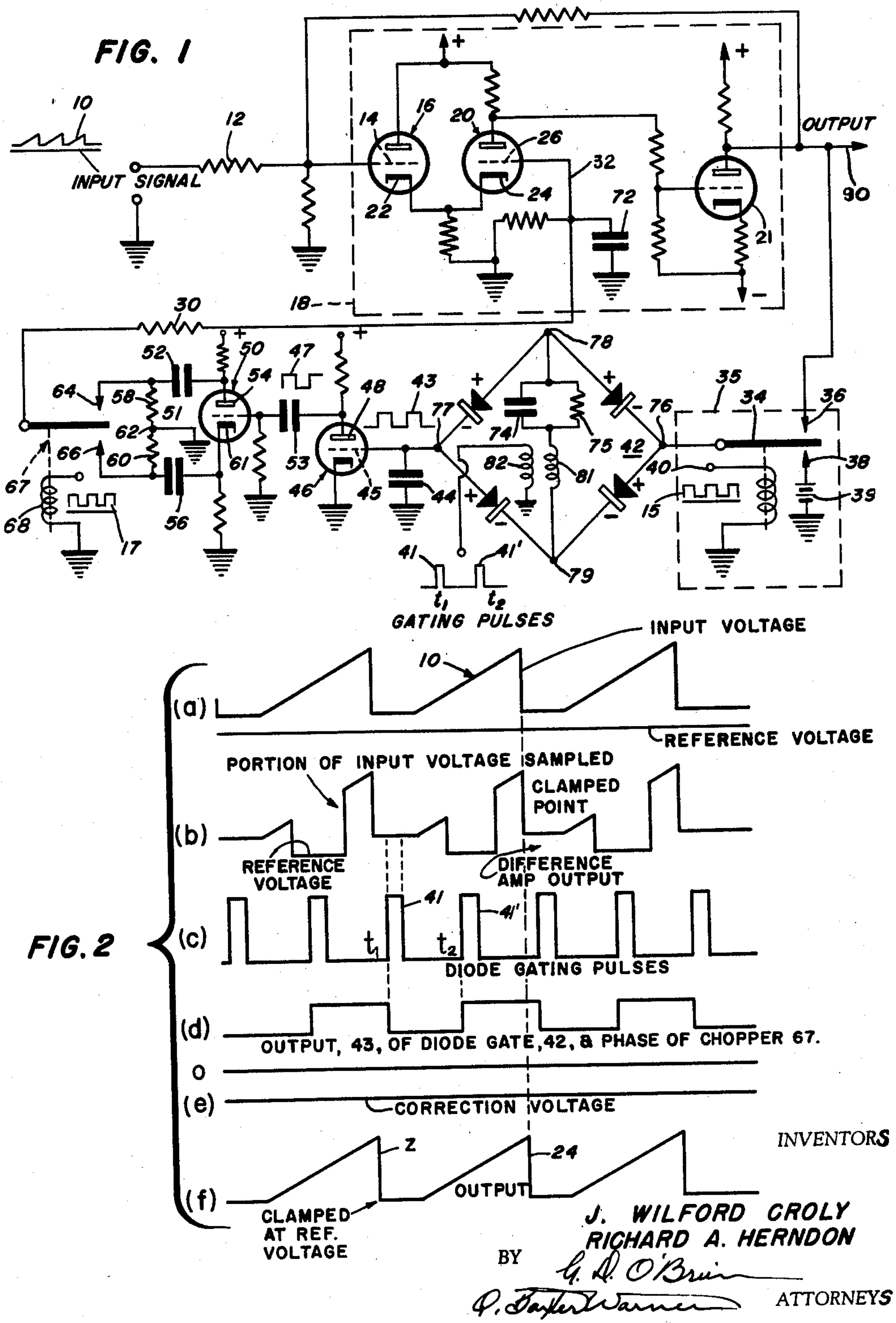

This invention relates generally to improved apparatus for clamping a selected point of a voltage waveform to any desired voltage and particularly to improved apparatus for more precisely clamping a signal where the D.C. level of the signal being clamped varies.

For many applications it is necessary that a signal voltage have a proper D.C. level in order to operate subsequent circuitry. It is necessary, therefore to clamp the signal voltage to the desired D.C. level.

An object of this invention is to provide improved apparatus for clamping any selected point of a voltage waveform to any desired voltage.

Another object is to provide a more accurate means for clamping any selected point of a voltage waveform to any desired voltage.

Another object is to provide a precision clamping circuit for applications where the D.C. level of the signal being clamped varies.

The foregoing objects are accomplished in accordance with the invention by an improved circuit wherein the signal to be clamped and a correction voltage are applied as inputs to a difference amplifier the output of which when corrected is clamped at the desired D.C. voltage. The correction voltage is obtained by comparing the output of the difference amplifier with a reference voltage to which clamping is desired. In a preferred embodiment of the invention, any difference in these two voltages will produce a square wave output from the comparing circuit of peak-to-peak amplitude equal to the voltage difference between the sampled point on the waveform and the reference voltage. The output from the comparing circuit is then amplified, and converted to push-pull. The push-pull amplified output is full-wave rectified and smoothed to provide the correction voltage which is applied to one input of the difference amplifier. This correction voltage changes the D.C. output level of the difference amplifier to eliminate any difference in the D.C. level of the output of the difference amplifier and the reference voltage. The comparison circuit and the full-wave rectifier both may comprise single-pole, double throw electro-mechanical vibrators driven at the frequency of the wave to be clamped.

Other objects and many of the attendant advantages of this invention will be readily appreciated as the same becomes better understood by reference to the following detailed description when considered in connection with the accompanying drawings, showing by way of example, a preferred embodiment of the invention and wherein:

Fig. 1 is a schematic circuit diagram of the D. C. clamp circuit;

Fig. 2*a* is a diagram of the waveform of the input voltage to be clamped; and

Figures 2*b* through 2*f* are diagrams of other operating waveforms in the circuit.

Similar reference characters are applied to similar elements throughout the drawings.

Referring to Fig. 1 the signal 10 to be clamped is applied through a series resistor 12 to the grid 14 of a first tube 16 in a difference amplifier circuit 18. The difference amplifier circuit includes first and second electron tubes 16, 20 the cathodes 22, 24 of which are connected together. The first tube 16 acts as a cathode follower and therefore the input signal is applied to the cathode 24 of the second tube 20. To the grid 26 of the second tube is applied, through a resistor 30, a correction voltage 32, which is obtained in the manner to be explained below. The output of the second tube 20 of the difference amplifier circuit 18 is proportional to its cathode-to-grid voltage and hence approximately proportional to the difference between the input voltage signal 10 and the correction voltage 32. The output of the second tube 20 of the difference amplifier 18 is then amplified by an additional stage of amplification containing tube 21. This additional stage of amplification is provided so that the feedback to grid 14 of tube 16 from the "output" will be negative in sense. The correction voltage 32 will change the difference amplifier's D.C. output level. The correction voltage is obtained in the following manner:

The movable output contact 34 of a first mehcanical chopper 35 is switched between the fixed contact 36 connected to the output of the difference amplifier and the fixed contact 38 connected to the reference voltage 39, such as a battery, to which the D.C. level of the input voltage is to be clamped. A driving voltage 15 is applied to the coil 40 of said first chopper so that the chopper operates at the same frequency as the input signal 10. The square wave driving voltage 15 has been generated separately and synchronized with the input signal. The square wave is used for purposes of convenience, it being understood that a sine wave could have been employed for the purpose of driving the choppers as is the more conventional practice. The wave shape of the driving voltage is immaterial so long as the proper phase of switching between contacts is obtained for sampling purposes. The output 34 of said first chopper is connected to the input of a diode bridge gate 42. The four diode bridge gate 42 is composed of four diodes connected in series − to +, − to −, + to −, + to +, to form a complete loop. The input signal to be gated is connected to the + to − junction 76; the output is taken from + to − junction 77. The remaining two junctions 78, 79 are connected by a circuit including the series connection of a transformer secondary winding 81 and the combination of a resistor 75 and a capacitor 74 in parallel. The gating pulses 41, 41′ synchronized with the input signal are applied to the primary 82 of the transformer. During intervals when there is no gating pulse 41, 41′ present, the gate 42 is "closed" because the charge on capacitor 74, due to conduction during the interval when the gating pulse is applied, back biases all the diodes; the time constant of the RC circuit 74, 75 being long compared to the time between pulses, but short enough so that appreciable diode current will flow during the next pulse. Due to the charge on the capacitor reaching an equilibrium position the gate only conducts when a gating pulse is present.

During the interval when said first chopper output contact 34 is connected to the amplifier output contact 36, the diode switch is turned on by a gating pulse 41, see Fig. 2*c*, at time $t_1$ corresponding to the point on the input waveform 10 to be clamped. The gated output 43 of the diode switch is held by a capacitor 44 connected to the output of the diode switch 42. When said first chopper output contact 34 is connected to the reference voltage contact 38, the diode switch is again turned on with a second gating pulse 41′ at time $t_2$, see Fig. 2*c*. Thus, the voltage on the output capacitor 44 will be a square wave 43, see Fig. 2*d*, of peak-to-peak amplitude equal to the voltage difference between the sampled point on the waveform 10 and the D.C. clamp voltage 39. This square wave 43 is applied to the grid 45 of a first triode amplifier tube 46 and the amplified square wave output 47 is then applied to the grid-cathode circuit of a second triode amplifier tube 50 by means of a capacitor from the anode 48 of the first amplifier tube 46 to the grid 51 of said second triode amplifier 50. Push-pull outputs are obtained from this second amplifier 50 through two series capacitors 52, 56, the first capacitor 52, being connected to the anode 54 of said second triode amplifier 50 and the second capacitor 56 to the cathode 61 of said second triode amplifier. The other terminals of the capacitors 52, 56 are terminated in two resistors 58, 60 connected in series, the junction 62 of the two resistors being grounded. Across the series resistors are connected the input contacts 64, 66 of a second chopper 67. To the coil 68 of the second chopper is applied a driving voltage, 17, synchronized with the input signal so that the second chopper operates at the same frequency and in phase with the output of the diode gate. The movable contact of the second chopper full-wave rectifies the amplified square wave. The rectified output is then filtered in a resistor capacitor filter 30, 72 and applied as the correction voltage to the grid 26 of the second tube 20 in the difference amplifier circuit 18. Any unbalance in the diode switch will have no effect on performance or accuracy since only the square wave amplitude is utilized for correction purposes.

Obviously many modifications and variations of the present invention are possible in the light of the above teachings. It is therefore to be understood that within the scope of the appended claims, the invention may be practiced otherwise than as specifically described.

What is claimed is:

1. A clamping circuit comprising connection means for a source of signal voltage input which is to be clamped, connection means for a source of reference voltage to which said signal voltage is to be clamped, amplifying means connected to said signal input means and providing an output signal, means responsive to the difference between said amplifier output signal and said reference voltage to provide a correction voltage, and means for applying said correction voltage to said amplifying means.

2. A clamping circuit comprising connection means for a source of signal voltage input which is to be clamped, connection means for a source of reference voltage to which said signal voltage is to be clamped, difference amplifying means connected to said signal input means and providing an output signal, means responsive to the difference between said difference amplifier output signal and said reference voltage to provide a correction voltage, and means for applying said correction voltage to said difference amplifying means.

3. A clamping circuit comprising connection means for a source of signal voltage input which is to be clamped, connection means for a source of reference voltage to which said signal voltage is to be clamped, difference amplifying means connected to said signal input means and providing an output signal, comparing means responsive to the difference between said difference amplifier output signal and said reference voltage to provide a correction voltage, and means for applying said correction voltage to said difference amplifying means.

4. A clamping circuit comprising connection means for a source of signal voltage input which is to be clamped, connection means for a source of reference voltage to which said signal voltage is to be clamped, difference amplifying means connected to said signal input means and providing an output signal, comparing means responsive to the difference between said difference amplifier output signal and said reference voltage, rectifying means connected to said comparing means to provide a correction voltage and means for applying said correction voltage to said difference amplifying means.

5. A clamping circuit comprising, in combination, first connection means for a source of signal voltage which is to be clamped, a difference amplifier including first and second tubes each having at least a cathode, anode, and control element, a common cathode resistor for said cathodes, means for applying said signal voltage to the control element of said first tube, means for deriving an output signal from the anode of said second tube, second connection means for a source of reference potential to which said signal voltage is to be clamped, comparing means including a chopper for alternately sampling said output signal and said reference voltage at the frequency of said signal voltage to derive sampled voltages, connections for a source of gating pulses, gating means including a four diode bridge gate for gating the sampled voltages at the time when a gating pulse is present, a capacitor on the output of the gate to maintain the last sampled voltage so that a comparison signal is derived, amplifying means to provide an amplified push-pull output of the comparison signal, rectifying means including a second chopper for alternately sampling the push-pull output at the frequency of said input signal to provide a correction voltage, means for applying said correction voltage to the control element of second tube of said difference to correct the D.C. level of the output of the difference amplifier.

References Cited in the file of this patent

UNITED STATES PATENTS

| | | |
|---|---|---|
| 2,293,750 | Leike | Aug. 25, 1942 |
| 2,615,064 | Stanton | Oct. 21, 1952 |
| 2,801,300 | Crane et al. | July 30, 1957 |
| 2,821,629 | Finkel et al. | Jan. 28, 1958 |